Patented Apr. 16, 1935

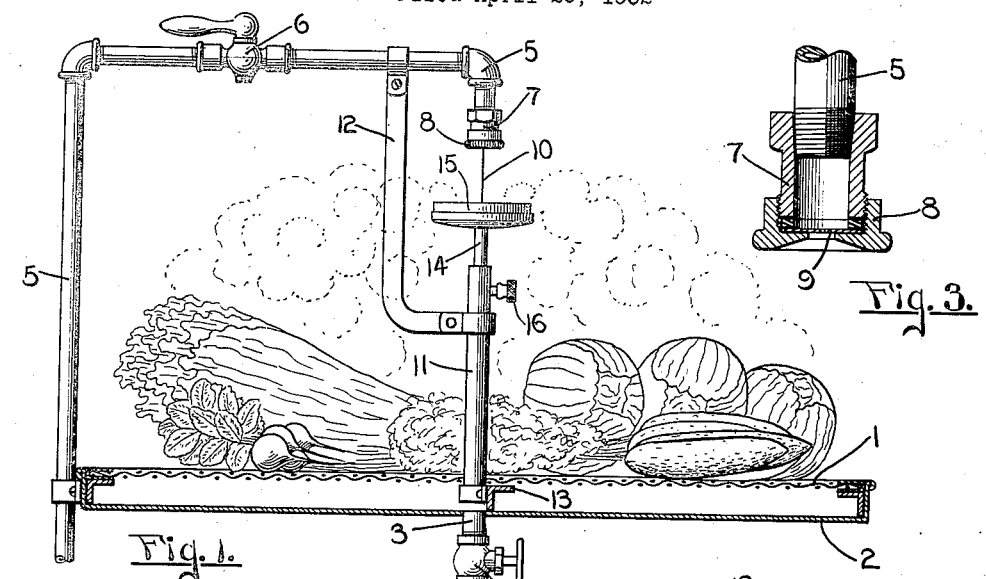
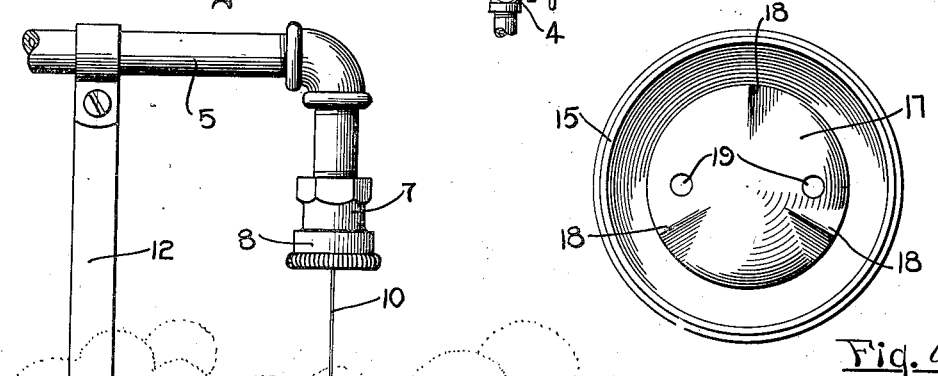
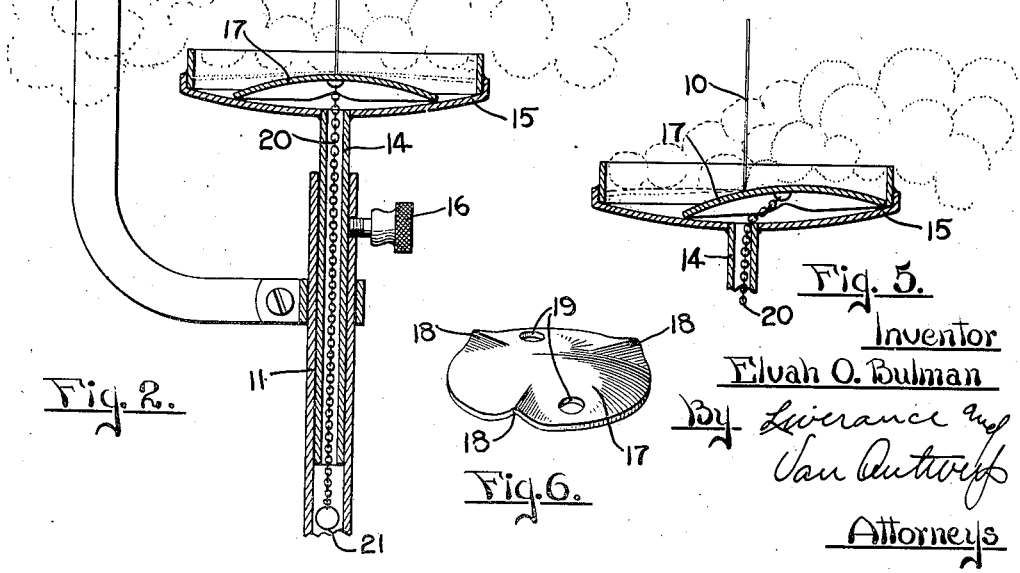

1,997,854

UNITED STATES PATENT OFFICE 1,997,854

SPRAY DEVICE

Elvah O. Bulman, Grand Rapids, Mich., assignor to E. O. Bulman Mfg. Co. Inc., Grand Rapids, Mich., a corporation of Michigan Application April 25, 1932, Serial No. 607,249

2 Claims. (Cl. 299—58)

This invention relates to improvements in spraying devices and particularly to such devices for spraying fruits and vegetables displayed for sale and for maintaining them in moist and cool condition.

The invention consists of a device for creating an extremely fine spray or mist of water which will float through the atmosphere and deposit upon the vegetables to keep them moist. The spray device provides means for directing the mist in different directions as may be desired for the purpose of moistening certain vegetables in one location on the tray when it is not desired to provide moisture for vegetables in another part of the tray. Also air currents, which would tend to carry the larger part of the mist in one direction, may be counteracted to some extent by the direction in which the mist is directed from the spraying device. An additional feature of the invention is a container which will retain moisture discharged from the spraying device in a location under the vegetables whereby the evaporation therefrom will aid in humidifying the air around the vegetables and such humidification may be used entirely to keep the vegetables in moist fresh condition during considerable periods when the spraying device is not in operation.

The invention provides various other new and useful features of construction and arrangement as hereinafter more fully described and particularly pointed out in the claims, reference being had to the accompanying drawing, in which, Fig. 1 is a vertical elevation, partly in section, of a spraying and humidifying device embodying this invention operatively arranged in association with a vegetable holding tray.

Fig. 2 is an enlarged view of the essential parts of the spraying device showing portions thereof in vertical section.

Fig. 3 is an enlarged vertical section of the nozzle of the spraying device.

Fig. 4 is a plan view of the cup and dome member.

Fig. 5 is a sectional elevation of the cup and dome members showing the dome shifted for angular direction of the spray, and Fig. 6 is a perspective view of the dome member.

Like reference numbers refer to like parts in all the figures.

A substantially horizontal vegetable supporting tray 1 is provided which preferably is made of mesh structure or other perforate material and this is supported within and appreciably spaced above the bottom of a relatively shallow pan 2. Although no means for supporting the pan is shown it is to be understood that the pan may be suitably supported by conventional legs or other framework or in fact may be laid upon a table if desired. The pan is designed to hold water and is provided in its bottom with a drain pipe 3 in which is located a valve 4 which may be manually opened or closed whereby, when closed, water may be prevented from draining through the pipe 3 from the pan.

A water spray pipe 5, provided with a shut-off valve 6, is suitably located to extend over the tray 1 and has its terminating end directed downwardly to which end is attached a nozzle 7. The nozzle in detail comprises the main body having an open lower end to which is screwed a cap 8 having a relatively large central opening and a disc 9 is clamped against the end of the body 7 by the cap 8, said disc having a very small central opening through which is emitted a fine stream of water from the pipe 5. The stream of water, indicated at 10, is directed downwardly in a substantially vertical direction.

In substantial alinement with the stream 10 and spaced considerably below the nozzle 7 a supporting sleeve 11 is located and suitably supported as by a bracket 12 which is attached to it and also clamped to a portion of the pipe 5 although other means of supporting the sleeve 11 may be used. The lower end of the sleeve 11 preferably extends through the tray 1 and terminates above the bottom of the pan 2 and may be additionally supported and held in place by being clamped to a brace 13 in the pan, said brace also serving as a center support for the tray 1. The lower end of the sleeve 11 is opened to communicate with the interior of the pan 2.

A hollow stem 14 is slidably located in the upper part of the sleeve 11 and projects from the upper end thereof, the upper end of the stem 14 carrying a cup 15 and the bottom of said cup having an opening communicating with the interior of the hollow stem 14 whereby water in the cup will drain through the stem and through the sleeve 11 into the pan 2. The stem 14 is held in desired vertical adjustment relative to the sleeve 11 by a set screw 16 screwed into said sleeve and having its end bearing against the exterior of the stem.

It has previously been stated that the sleeve 11 is located in substantial alinement with the stream of water 10 emitted from the nozzle 7 and thereby it will be understood that the cup 15, carried by the stem 14 in said sleeve, is also centrally located relative to said stem. A spray dome 17 is located within the cup and supported upon the bottom thereof, which dome is directly in the path of the stream 10 and causes said stream, when impinged against it, to be broken up into fine particles some of which are extremely fine and float away in the nature of a mist.

The dome is preferably formed of sheet metal stamped into substantially convex shape and has a plurality of upward indentations 18 at its periphery. The disc also is preferably provided with holes 19 extending through it near its periphery. The dome is movably retained in its approximate location by a chain 20 attached to its under surface and extending through the hollow stem 14 and a ring 21 of greater diameter when the interior of the stem 14 is attached to the lower end of the chain below the end of the stem which prevents removal of the dome from the device but permits ready change of position of the dome in the cup 15. The bottom of the cup 15 is preferably of concaved shape, its curvature being opposite to the curvature of the dome for a purpose hereafter described.

Operation

With vegetables or other articles to be moistened supported on the tray 1 and water under pressure supplied to the pipe 5 and the valve 6 open a fine stream of water is emitted from the nozzle 7 through the hole in the disc 9 and is directed downwardly with considerable force and impinges against the upper convex surface of the dome 17. Upon striking the convex surface of the dome the stream is broken up into fine particles, the coarser of which because of the curvature of the surface, are directed laterally and are retained within the vertical walls of the cup 15. A portion of the water of the stream, however, is reduced to such minute particles as will float in the atmosphere in the form of a mist which mist rises from the cup and floats over the vegetables in the tray and is deposited thereon to moisten them.

The mist is caused to rise from the cup and is directed in its movement therefrom by air currents set up by motion of the stream 10 and the large particles of water therefrom as they are deflected from the dome, such air currents moving outwardly from the stream. If the dome 17 is arranged with its center in exact alinement with the stream 10 as shown in Fig. 2 then the lateral displacement of water will be substantially equal in all directions and the air currents created thereby will likewise travel equally in all directions radially and upwardly from the stream and carry the mist away from the cup substantially uniform in all directions.

If it is desired to cause the mist to move from the cup in any one general direction then the position of the dome relative to the stream may be shifted by simply moving it laterally upon the bottom of the cup, the dome being held in any desired position only by gravity and frictional resistance. When the dome is moved so that its center is not in alinement with the stream 10 then said stream strikes a portion of the dome, which is inclined downwardly toward one side of the cup, and the coarser particles of water are deflected from that surface toward the adjacent side of the cup. These particles of water are in the form of a stream, see Fig. 5, and this stream impinges against the inner wall of the cup and causes the mist to float away in the direction shown.

The concaved bottom of the cup causes an accentuation of the inclination of the dome when it is moved laterally away from its central position as illustrated in Fig. 5. The periphery of the bottom of the cup, being higher than the central part, causes the edge of the dome moved toward the periphery to rise while the edge of the dome moved toward the center lowers and this detail of construction requires less lateral movement of the dome to acquire the desired angle of the surface thereof which is contacted by the stream. The concave bottom also assists in draining water from the cup.

By vertically adjusting the cup and dome accomplished by loosening the set screw 16 and sliding the stem 14 in the sleeve 11, and thereby moving the dome closer to or farther from the nozzle 7, the quality of the spray may be adjusted. The stream is finer and has greater force near the nozzle and farther from the nozzle it spreads to some extent and loses some of its force and therefore if it is caused to impinge against the dome close to the nozzle it will be broken into finer particles and cause a greater amount of mist to emanate than when the dome is moved farther from the nozzle.

The water retained within the cup 15 finds its way beneath the dome through the indentations 18 at the edge thereof and also through the openings 19 through the dome which are provided to drain excessive amounts of water, and thence drains through the hollow stem 14 and the sleeve 11 and is deposited in the pan 2. If desired the valve 4 in the drain pipe 3 may be opened so that water thus deposited in the pan will be drained therefrom through the pipe 3 but if the valve 4 is closed the water is retained in the pan and after a considerable period sufficient water will accumulate to partially fill the pan. The pan is caused to contain water as above described at times when it is desirable to cease operation of the spraying device for a considerable period and still maintain humidity in the atmosphere surrounding the vegetables and under these conditions the shut-off valve 6 may be closed which will stop operation of the spraying device and moisture evaporated from the water in the pan will rise into the vegetables above it and such moistening and humidifying may be aided by covering the pan and vegetables on the tray with a cloth which will tend to retain the moisture to a large extent.

The invention is defined in the appended claims and is to be considered comprehensive of all forms of structure coming within their scope.

I claim:

1. A device of the class described comprising a nozzle constructed and arranged to eject a minute stream of water downwardly, a supporting member having an outlet leading downwardly, a member having a curved impact surface located upon the supporting member in the path of the stream of water, a chain fastened to the impact member and extending downwardly in the outlet and means on the chain to prevent its removal from the outlet but permitting a limited withdrawal whereby vertical and lateral adjustment of the impact member is permitted.

2. In a construction of the type described, a nozzle constructed and arranged to eject a relatively minute stream of water downwardly, a cup having a relatively flat bottom surface and side walls extending upwardly at substantially right angles thereto, an impact disc of considerably lesser size than the interior of the cup located therein, said impact disc having its upper surface of convex form and being movable to a plurality of positions for the purpose described, and outlet means leading from the said cup, the several parts being constructed and arranged so that the stream of water impinges against the impact disc below a plane through the top edge of the side walls regardless of the positioning of the impact disc within the cup.

ELVAH O. BULMAN.